(12) United States Patent
Wako

(10) Patent No.: US 7,869,938 B2
(45) Date of Patent: Jan. 11, 2011

(54) METHOD AND APPARATUS FOR DISPLAYING SIMPLIFIED MAP IMAGE FOR NAVIGATION SYSTEM

(75) Inventor: Hikaru Wako, Torrance, CA (US)

(73) Assignee: Alpine Electronics, Inc, Tokyo (JP)

(*) Notice: Subject to any disclaimer, the term of this patent is extended or adjusted under 35 U.S.C. 154(b) by 741 days.

(21) Appl. No.: 11/729,556

(22) Filed: Mar. 29, 2007

(65) Prior Publication Data

US 2008/0243367 A1    Oct. 2, 2008

(51) Int. Cl.
*G01C 21/00* (2006.01)

(52) U.S. Cl. .................. 701/200; 345/421; 345/427

(58) Field of Classification Search .......... 701/200; 382/113; 345/133, 139, 419, 421, 425, 427
See application file for complete search history.

(56) References Cited

U.S. PATENT DOCUMENTS

| | | | |
|---|---|---|---|
| 6,169,552 B1* | 1/2001 | Endo et al. | 345/427 |
| 7,076,505 B2* | 7/2006 | Campbell | 707/104.1 |
| 2003/0036842 A1* | 2/2003 | Hancock | 701/200 |
| 2003/0059091 A1* | 3/2003 | Kambe et al. | 382/113 |

FOREIGN PATENT DOCUMENTS

JP    2002-039778    2/2002

* cited by examiner

*Primary Examiner*—Khoi Tran
*Assistant Examiner*—Rodney King
(74) *Attorney, Agent, or Firm*—Muramatsu & Associates

(57) ABSTRACT

The display method and apparatus for a navigation system interchangeably displays a normal map image and a simplified map image in accordance with a user's preference and complexity of the map image. The method includes the steps of checking whether a simple map mode or a normal map mode is set for displaying a map image on a monitor screen of the navigation system, determining which map elements are selected to be displayed when the simple map mode is set, and displaying the map image with only the selected map elements when the simple map mode is set while displaying the map image with all the map elements when the normal map mode is set. The navigation system is designed to switch between the normal map mode and the simple map mode either manually or automatically.

16 Claims, 12 Drawing Sheets

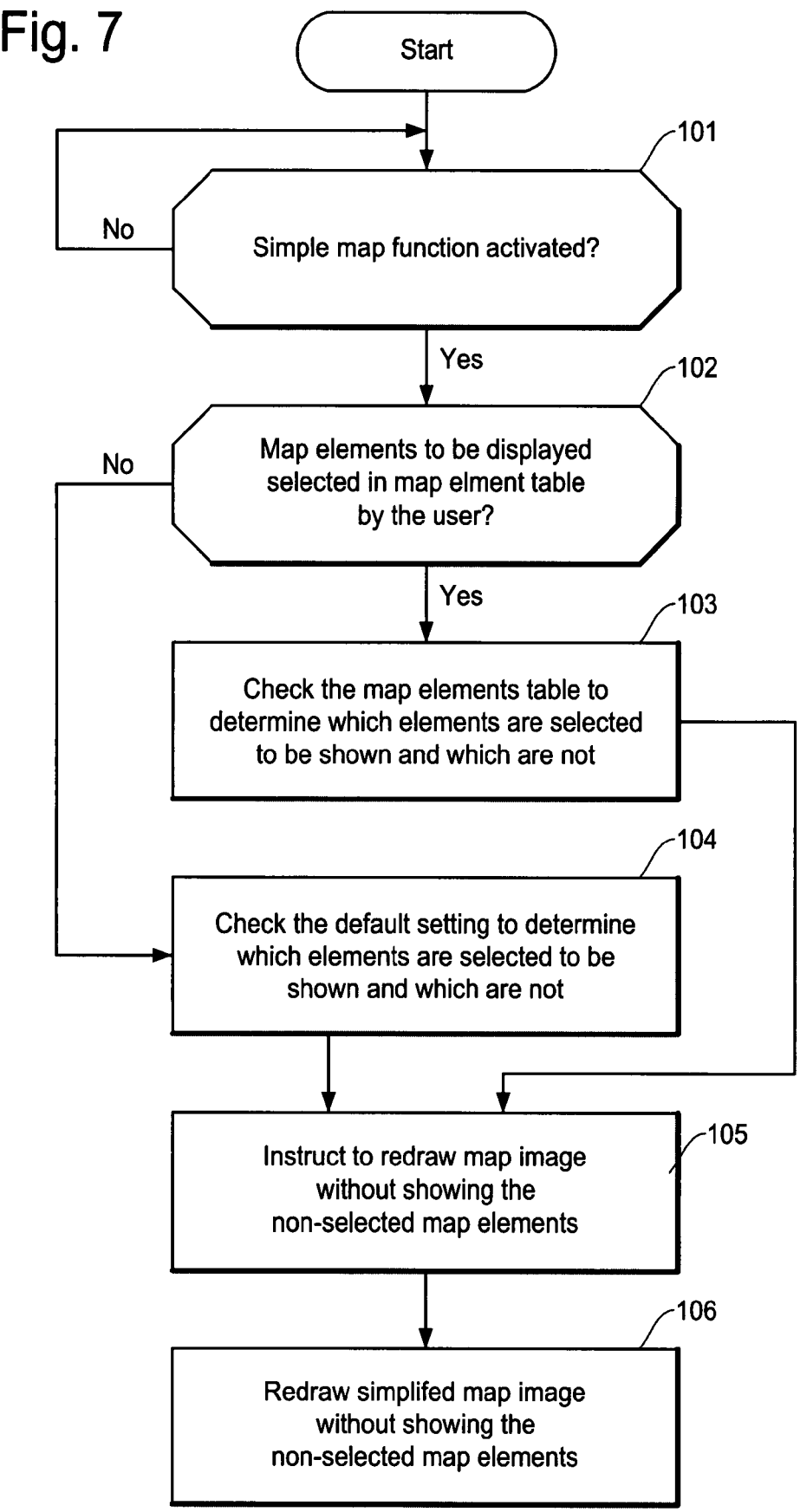

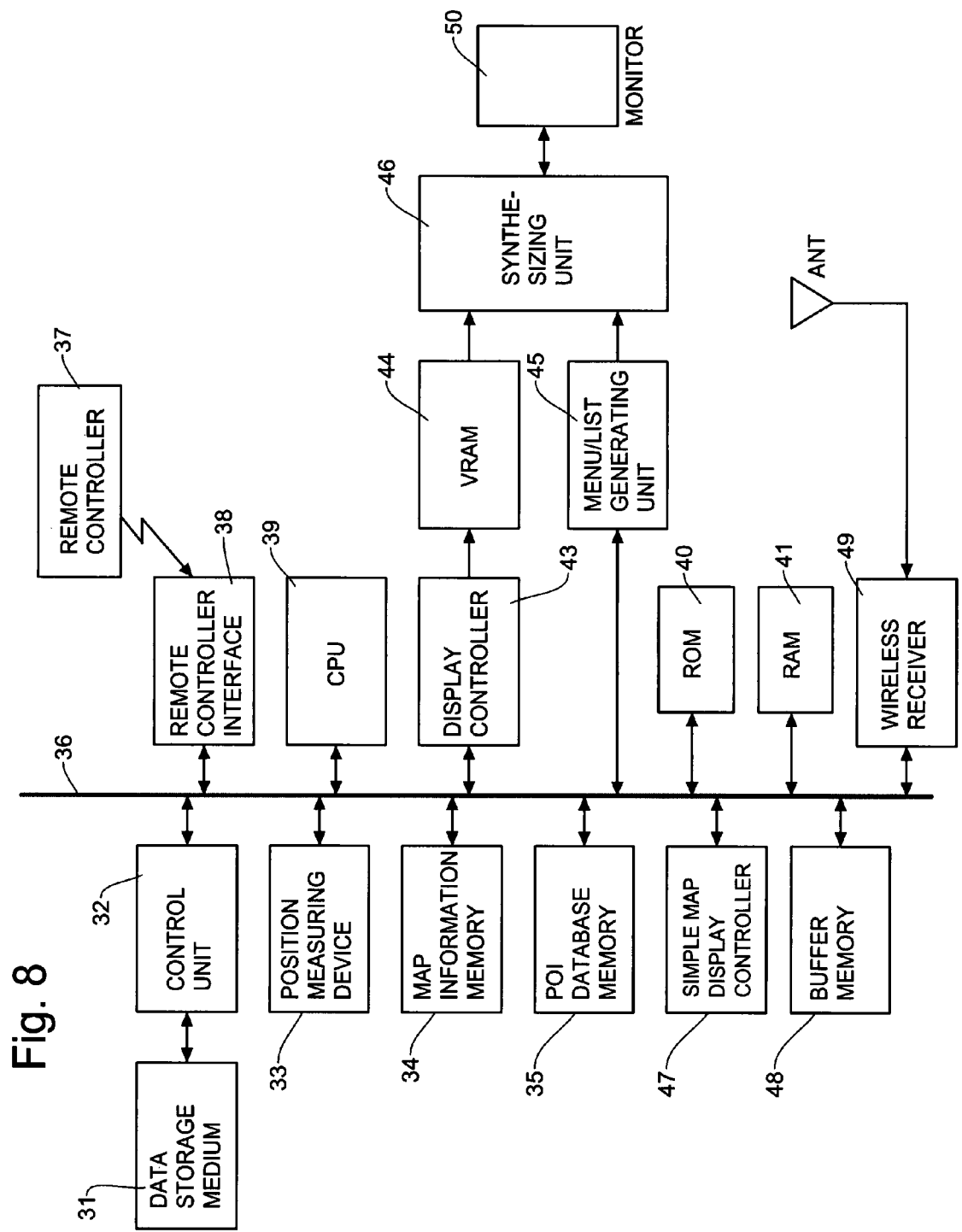

| COORDINTES (LONGITUDE/ LATITUDE) | POI ICON RECORD | NAME OF ADJACENT ROAD | LINK (NODES N1 AND N2) | CATEGORY | NAME |
|---|---|---|---|---|---|
| (x1, y1) | R | ABC AVE | — — — — | RESTAURANT | BBB RESTAU -RANT |
| — — — | — — — | — — — | — — — | — — — | — — — |

Fig. 12A

| CATEGORY LIST |
|---|
| ATM |
| BANK |
| GASOLINE STATION |
| HOTEL |
| PARKING LOT |
| RESTAURANT |
| HOSPITAL |
| SHOPPING |
| ...... |

Fig. 12B

| RESTAURANT LIST |
|---|
| AAA RESTAURANT |
| BBB RESTAURANT |
| ...... |

Fig. 12C

| DETAILED INFORMATION LIST |
|---|
| ADDRESS |
| TEL NO. |
| OPENING TIME CLOSING TIME |
| CUISINE / MENU |
| ...... |

METHOD AND APPARATUS FOR DISPLAYING SIMPLIFIED MAP IMAGE FOR NAVIGATION SYSTEM

FIELD OF THE INVENTION

This invention relates generally to a display method and apparatus for a navigation system, and more particularly, to a method and apparatus for interchangeably displaying a normal map image and a simplified map image in accordance with a user's preference and complexity of the map image.

BACKGROUND OF THE INVENTION

A navigation system performs travel guidance for enabling a user to easily and quickly reach the selected destination. A typical example is a vehicle navigation system where a vehicle is equipped with a navigation function to guide a driver to a destination through a calculated route. Such a navigation system detects the position of the user's vehicle, and reads out map data pertaining to an area at the current vehicle position from a data storage medium, for example, a CD-ROM (compact disc read-only memory), a DVD (digital versatile disc), or a hard disc. Typically, the navigation system displays a map image on a monitor screen on which the current vehicle position and calculated route are illustrated to guide the user to the destination. The user is able to scroll the map image to see desired locations as well.

FIG. 1 shows a display example of a map image on a monitor screen of a navigation system, where the various map elements are shown. This is a typical example of map image showing a downtown area of a city which includes roads, buildings, and POIs (points of interests) that are illustrated in a three-dimensional image. In the example of FIG. 1, it has a large number of POI icons, such as gas stations, restaurants, and hotels as well as many buildings, large scale and small scale roads. Moreover, it also has traffic information icons, function keys and menus bars for operations of the navigation system.

Although the map image presents useful information, the driver would be overwhelmed by vast arrays of information to detect the information which the driver needs at the moment. There may be a danger that the driver can be distracted from driving by overwhelming amount of information, which can lead to a traffic accident. Especially, the important information such as roads and intersections will be hidden by the building images illustrated in the three-dimensional manner as shown in FIG. 1.

Therefore, it is desired that the navigation system is able to prioritize more important information and shows those prioritized information while hiding less important information, thereby assisting the user to concentrate on driving while providing relevant information. Moreover, there is a need of a new display method in that the user can easily switch between a prioritized or simplified map view and a normal map view.

SUMMARY OF THE INVENTION

It is, therefore, an object of the present invention to provide a display method and apparatus for a navigation system which is capable of displaying a simplified map image when a normal map image is complicated because of having a large number of map elements.

It is another object of the present invention to provide a display method and apparatus for a navigation system which is capable of manually or automatically changing between the simplified map image and the normal map image so that desired information can be detected easily and quickly on the screen by the user.

It is a further object of the present invention to provide a display method and apparatus for a navigation system which is capable of pre-setting as to which map elements will be displayed and which map elements will not be displayed in the simplified map image so that the degree of simplifying the map image can be adjusted.

One aspect of the present invention is a display method for a navigation system to prioritize and simplify a map image on a monitor screen. The method includes the steps of: checking whether a simple map mode or a normal map mode is set for displaying a map image on a monitor screen of the navigation system, determining which map elements are selected to be displayed when the simple map mode is set, and displaying the map image with only the selected map elements when the simple map mode is set while displaying the map image with all the map elements when the normal map mode is set.

The display method further includes a step of setting either the simple map mode or the normal map mode in the navigation system. The step of setting the simple map mode or the normal map mode is conducted manually by operating a switch on the navigation system. Alternatively, the step of setting the simple map mode or the normal map mode is conducted automatically by an operation of a specified function of the navigation system.

An example of the specified function of the navigation system is a map scroll function by which the map image is scrolled to a selected location. The map image in the simple map mode is displayed when the map scroll function is inactive while the map image in the normal map mode is displayed when the map scroll function is activated.

The display method of the present invention further includes a step of selecting which map elements should be displayed and which map elements should not be displayed on the map image in the simple map mode. This process of selecting which map elements should be displayed includes a step of displaying a screen which lists categories of the map elements so that a user can specify which map elements should be displayed in the simple map mode.

Another aspect of the present invention is a display apparatus for a navigation system to prioritize and simplify a map image on a monitor screen by implementing the various steps of the display method described above. The display apparatus of the present invention enables to simplify the map image so that the simple map allows the user to quickly grasp the important information at a glance. The simple map view shows a simplified map image which eliminates some of the map elements with lower priority.

According to the present invention, the navigation system enables to simplify the map image so that the simple map allows the user to quickly grasp the important information at a glance. The navigation system is capable of pre-setting as to which map elements will be displayed and which map elements will not be displayed in the simplified map image so that the degree of simplifying the map image can be adjusted. The navigation system is designed to switch between the normal map view and the simple map view by an operation of a switch or key. Alternatively, the normal map view and the simple map view are automatically switched therebetween depending on whether a specific function is operated or not. The simple map view shows a simplified map image which eliminates some of the map elements with lower priority to avoid the driver from being distracted from driving when he/she would try to obtain the information from the complicated map image.

BRIEF DESCRIPTION OF THE DRAWINGS

FIG. 2A shows a normal map image and FIG. 2B shows a simplified map image under the present invention.

FIG. 3A shows a normal map image and FIG. 3B shows a simplified map image under the present invention.

FIG. 4A shows the simplified map image and FIG. 4B shows a normal map image.

FIG. 7 is a flow chart showing an example of overall operational procedure for eliminating the selected map elements from the map image and redrawing the simplified map image on the monitor screen of the navigation system under the present invention.

FIG. 8 is a block diagram showing an example of configuration of a vehicle navigation system implementing the simple map display method of the present invention.

FIG. 6A shows road links or segments and FIG. 6B shows polygon data.

FIGS. 12A-12C illustrate an example of layered structure of the POI data in the map database for illustrating the POI icons on the monitor screen of the navigation system.

DETAILED DESCRIPTION OF THE PREFERRED EMBODIMENT

The display method and apparatus of the present invention will be described in detail with reference to the accompanying drawings. The present invention enables to simplify the map image so that the simple map allows the user to quickly grasp the important information at a glance. The present invention is designed to switch between a normal map view and a simple map view by operation of a switch. Further, the normal map view and the simple map view are automatically switched therebetween depending on whether a specific function is operated or not.

The simple map view shows a simplified map image which eliminates some of the map elements with lower priority to avoid the driver from being distracted from driving when he/she tries to obtain information from the complicated map image. It should be noted that although the description will be made where the simple map method and apparatus of the present invention is implemented to a vehicle navigation system, the simple map method and apparatus of the present invention can be implemented to other devices, such as portable devices, personal computers, etc.

Figure 1:
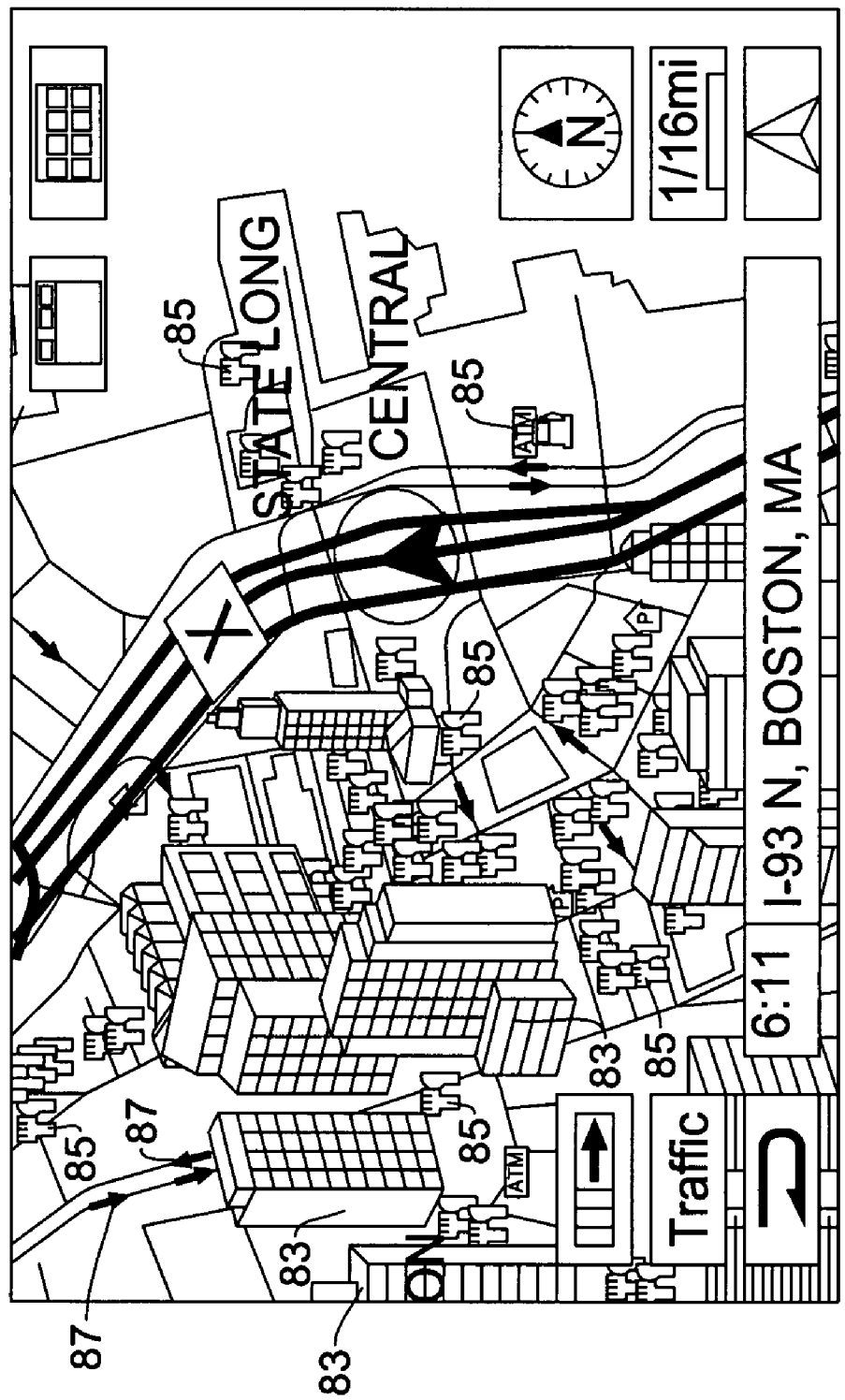
FIG. 1 is a display example of a map image on a monitor screen of a conventional navigation system which shows a large number of map elements on a three-dimensional map image that typically arises when a vehicle is in a congested area.
Figure 2A:
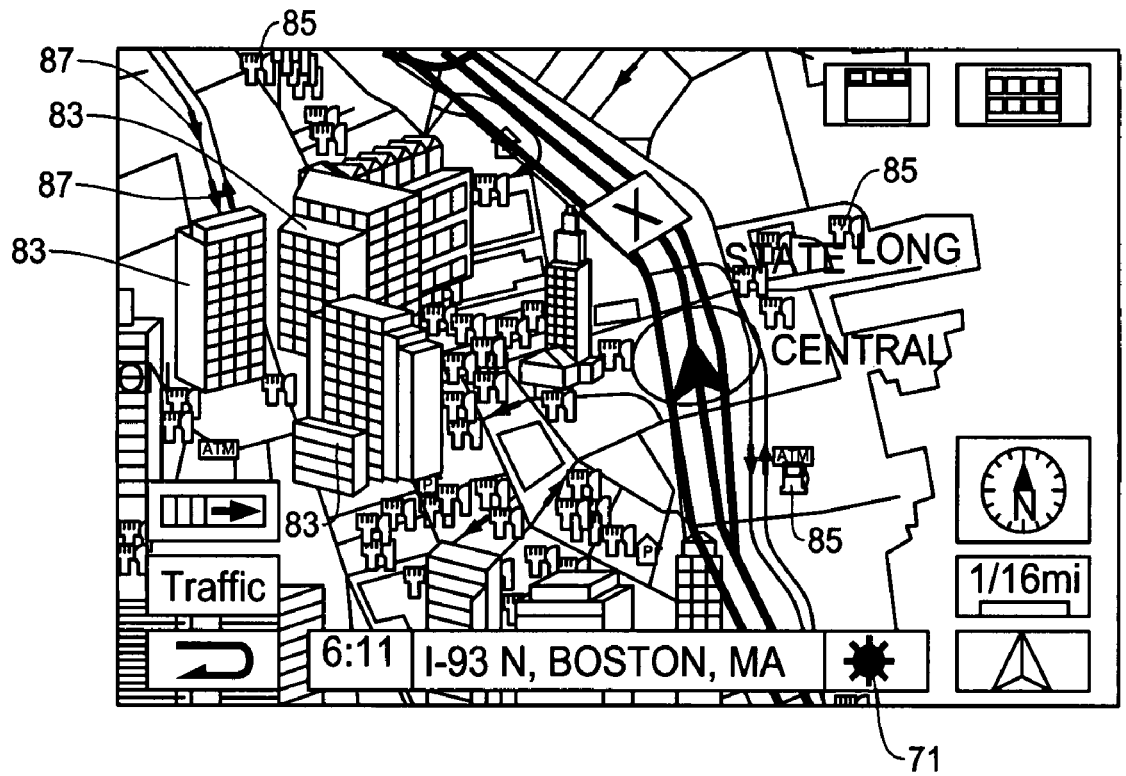
FIGS. 2A and 2B show examples of map image of the congested area corresponding to FIG. 1 when the navigation system is in a locator map operation, where
Figure 2B:
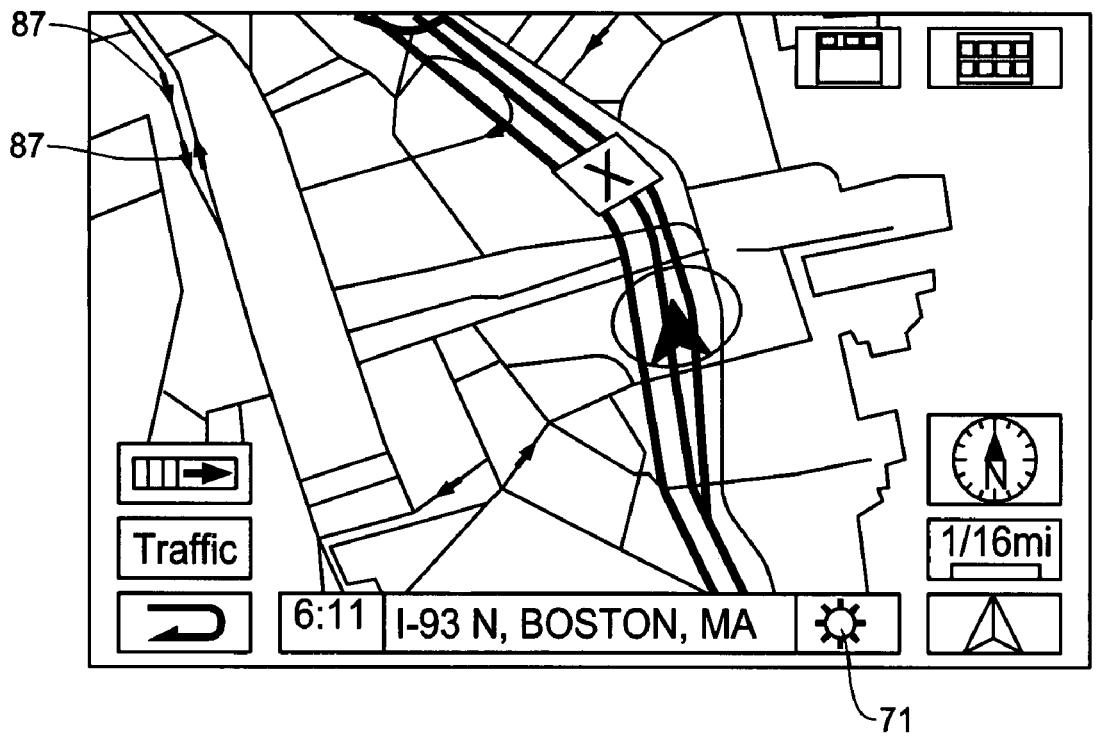

FIGS. 2A and 2B are display examples in the present invention implementing the simple map mode where the screen shows the map image of a congested area such as a downtown of a city. FIGS. 2A and 2B shows the condition where the navigation system is in a locator map mode. The locator map mode is a mode of operation where the current vehicle position is shown on the map image and the map image changes to reflect the movements of the vehicle. Typically, the locator map mode is used when a destination is not specified for the navigation system, thus, no calculated route to the destination is displayed on the monitor screen.

FIG. 2A shows an example of map image on the monitor screen in the normal mode view of the navigation system. As shown, a large number of map elements, such as buildings, POI icons, traffic icons, building footprints, etc. are displayed in addition to various levels (classes) of roads. More specifically, many traffic icons (arrows) 87, large building images 83, POI icons 85 are shown in a small area in the map image of FIG. 2A. This could be distracting to the driver from the driving because some roads and intersections are hidden by other map elements.

On the screen, a simple map switch key 71 is provided at the lower end thereof, which is capable of switching the screen of navigation system between the normal map mode and the simple map mode. When the user presses or otherwise executes the simple map switch key 71, the navigation system will change the map image to the simple map mode shown in FIG. 2B. In other words, the simple map switch key 71 is designed to either hide the selected map elements from the map image or resume the hidden map elements on the map image. As shown, in the simple map mode, the POI icons 85 and building images 83 are eliminated from the map view to provide a simplified map image.

Figure 3A:
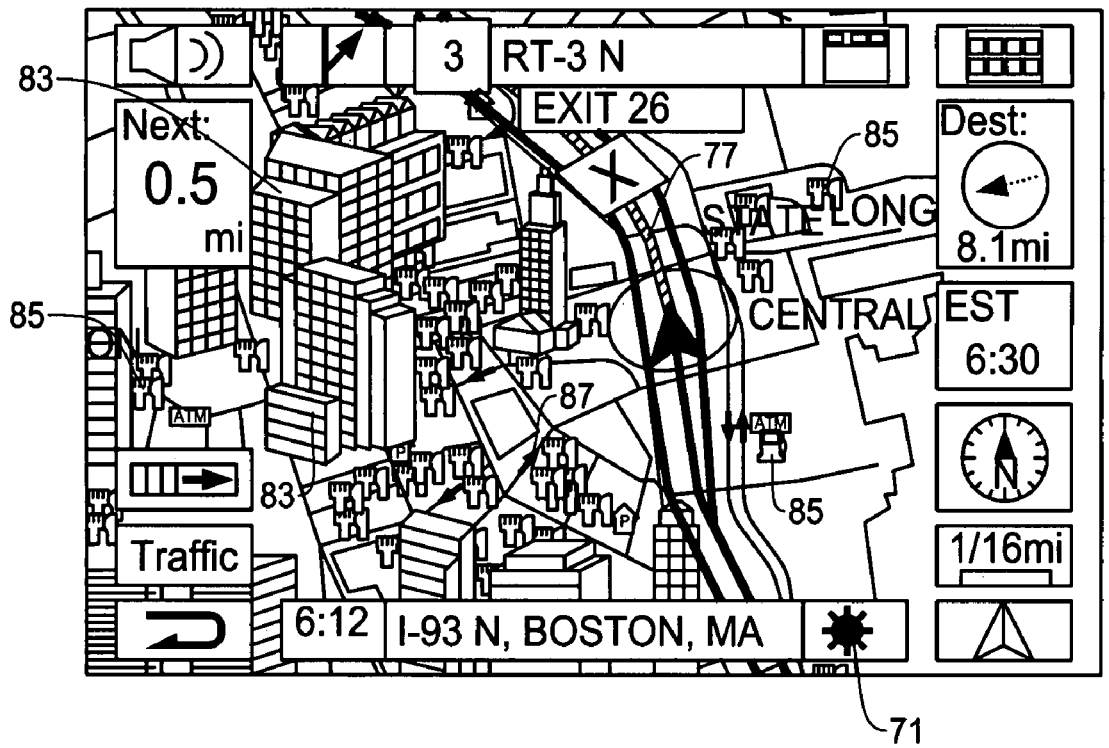
FIGS. 3A and 3B show examples of map image of the congested area corresponding to FIG. 1 when the navigation system is in a route guidance operation, where
Figure 3B:
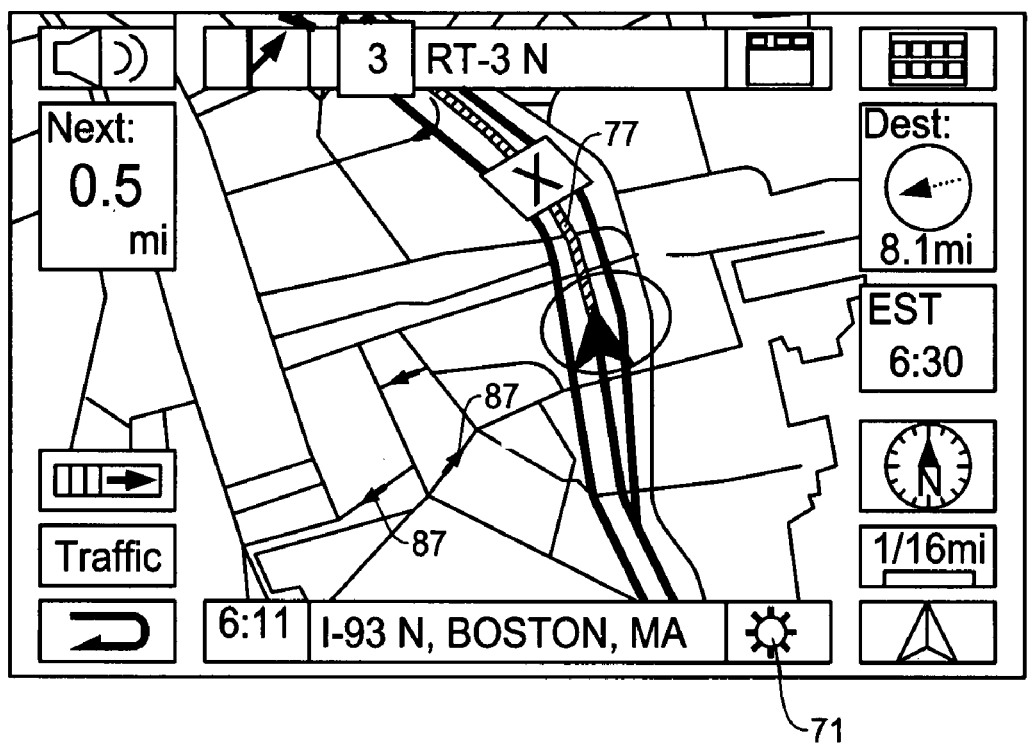

Similarly, FIGS. 3A and 3B show display examples in the present invention implementing the simple map mode where the screen shows the map image of the congested area which is the same as that of FIGS. 2A and 2B. FIGS. 3A and 3B show the condition where the navigation system is in a route guidance mode. The route guidance mode is a mode of operation where the navigation system provides the route guidance to a destination after calculating an appropriate route to the destination. The map image of FIGS. 3A and 3B indicates the calculated route 77 to the destination on the map image which is typically highlighted to show maneuvering directions on the route.

FIG. 3A shows the map image in the normal map mode, whereas FIG. 3B shows the map image in the simple map mode. In the simple map mode of FIG. 3B, the POI icons 85 and large building images 83 are eliminated while the more important information, i.e., the guidance route 77 and traffic icons 87, and road images remain visible. Thus, depending on the selected map mode in which the navigation system is operated, the map elements that are eliminated or remained on the map image may differ.

In the above examples of FIGS. 2A-2B and 3A-3B, the display includes the simple map switch key 71 to switch between the normal map mode and the simple map mode. It is also possible that, in addition to the simple map switch key 71, the navigation system can be designed to automatically switch between the normal map mode and the simple map mode depending on the circumstances. For example, the navigation system can change from the normal map mode to the simple map mode or vice versa in response to activation of a specific function of the navigation system.

Figure 4A:
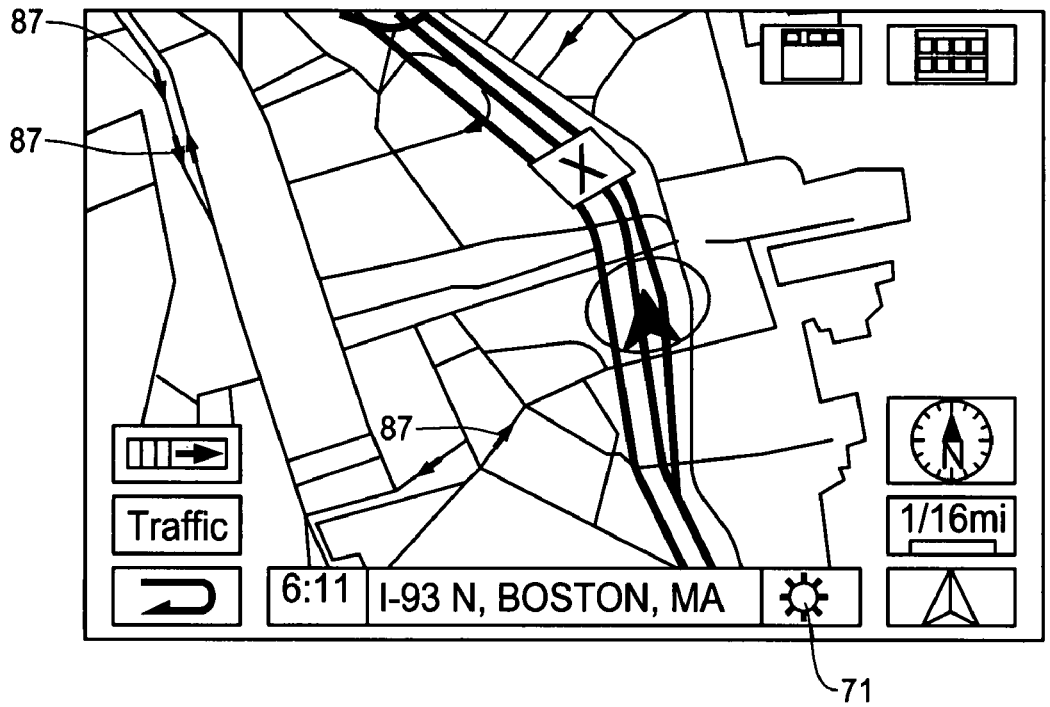
FIGS. 4A and 4B show examples of map image of the congested area corresponding to FIG. 1 in which the normal map image and the simplified map image are automatically switched therebetween when a scroll function is activated, where
Figure 4B:
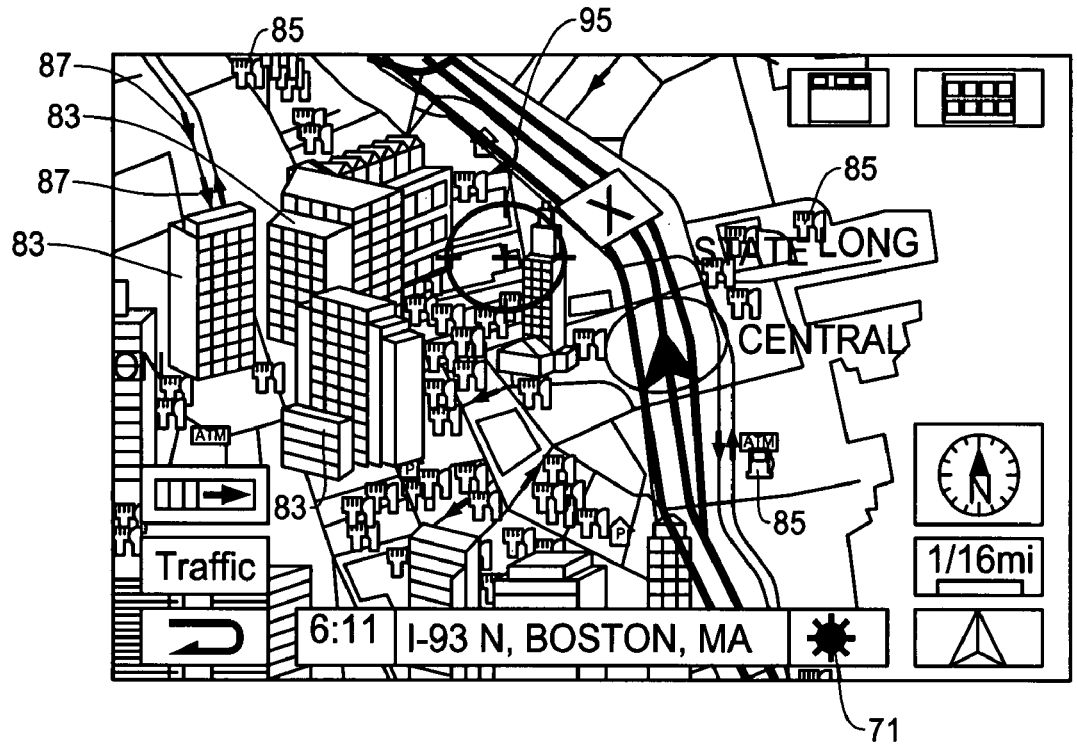

FIGS. 4A and 4B are display examples showing an example of automatic switching between the normal map mode and the simple map mode. In this example, the switching between the normal map mode and the simple map mode is conducted based on whether a map scroll operation is activated or not. FIG. 4A shows a map image in the simple map mode which arises when the map scroll key is not operated and FIG. 4B shows a map image in the normal map mode which arises when the map scroll key is operated.

As shown in FIG. 4A, when the map scroll operation is not conducted, the map elements of lower priority are eliminated in order to produce the simplified and less clustered map image. For example, when the user is following the route guidance by the navigation system on the calculated route to the destination, it is usually unnecessary to see or even annoying to see too much information, i.e, map elements, on the screen. Thus, in such a situation, the navigation system changes to the simple map mode as shown in FIG. 4A.

Conversely, as shown in FIG. 4B, when the user operates the scroll key to scroll the map image to find a particular location (ex. by dragging a cursor 95), the navigation system will automatically switch from the simple map mode to the normal map mode. This is because, when the driver scrolls the map image, he/she typically wants to know the detailed information regarding the area where the map is scrolled to find a desired place. Thus, in such a situation, the navigation system changes to the normal map mode as shown in FIG. 4B to display all of the map elements such as POI icons and building images, etc.

Figure 5:
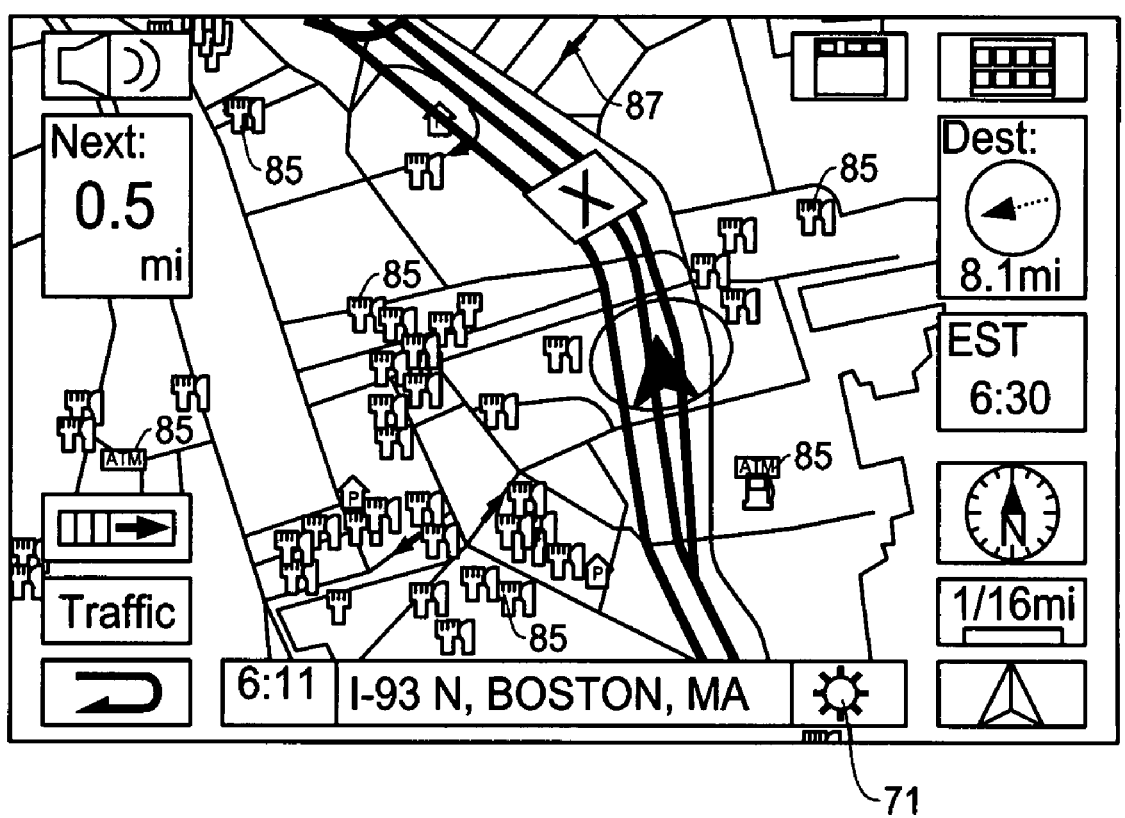
FIG. 5 shows another example of map image in the simple map mode for the area corresponding to the example of FIGS. 1-4B in which three-dimensional images of large buildings are removed from the map image view while the POI icons and other map elements remain the same.

Although the simple map mode in the foregoing description eliminates the POI icons 85 and large building images 83, the map elements that are eliminated and retained are not limited to the above described example. FIG. 5 is a display example in the simple map mode, wherein the large building images 83 are eliminated from the map view while retaining the POI icons 85. As will be explained below in detail, the user may set which map elements are displayed or eliminated from the map view.

Moreover, in the above example, the navigation display has two modes, namely, the normal map mode and the simple map mode that can be switched by the simple map switch key 71 or automatically as noted above. However, the navigation system may have a plurality of simple map modes where the extent to which map elements are eliminated differ in order to provide a more fine-tuned map image. For instance, one simple map mode may eliminate only large building images 83, while another simple map mode may eliminate large building images 83, POI icons 85, and traffic icons 87.

Figure 6A:
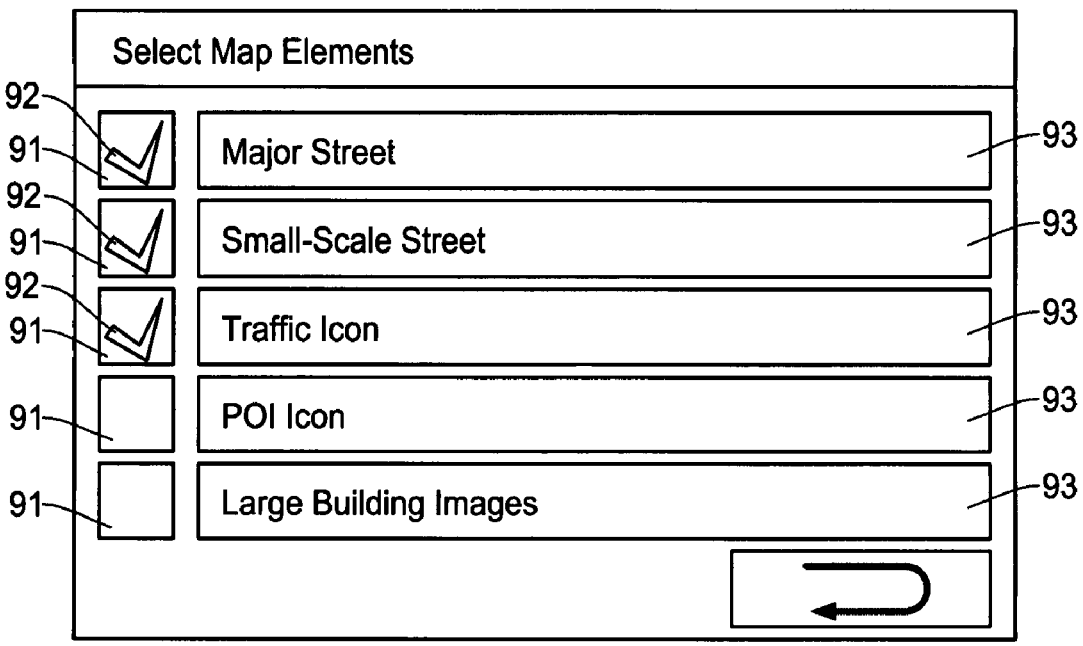
FIGS. 6A and 6B are schematic diagrams showing display examples of navigation system which enables the user to set up the navigation system as to which map elements are to be hidden or displayed in the simple map mode.
Figure 6B:
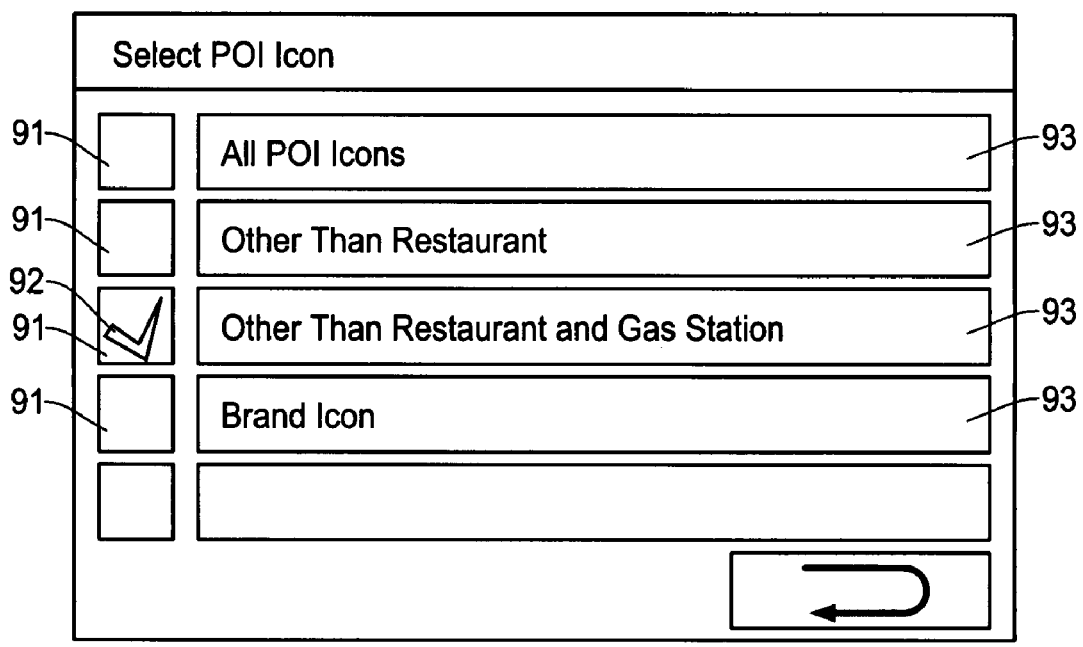

The criteria as to which map elements are to be eliminated and which elements are to be unchanged on the map image when the simple map mode is enabled may be pre-set by a manufacturer of a navigation system. Alternatively, in addition to such default settings, a user of a navigation system may also be able to set the criteria through a set-up procedure of the navigation system. FIGS. 6A and 6B are display examples where the user selects or de-selects the map elements to set the criteria of the simple map.

By selecting a map element as shown by the check mark, the user is able to elect the map elements to appear on the map image in the simple map mode. In the example of FIG. 6A, five categories of the map elements are listed in the windows 93 on the screen. The user has selected three types of map elements, i.e., the major streets, small-scale streets, and traffic icons to be displayed on the simple map while eliminating the POI icons and large building images. Here, the user provides marks 92 in corresponding boxes 91 so that the specified map elements be displayed on the map image in the simple map mode.

FIG. 6B shows an example of screen which will be displayed when the user selects the POI icon in FIG. 6A. In the example of FIG. 6B, the navigation system allows the user to select what types of POI icons be displayed in the simple map mode. When the user selects "other than restaurant and gas station", all of the POI icons except the icons indicating restaurants and gas stations will be displayed on the map image in the simple map mode. It should be noted that the selection methods described above with reference to FIGS. 6A and 6B are merely an example, and other map elements may also be shown for selection and de-selection for the simple map mode.

FIG. 7 is a flow chart showing an example of the basic steps involved in the overall procedure for displaying the simplified map image under the present invention. As the procedure starts, the navigation system will check whether the user has enabled the simple map mode in the step 101. The user may use a map switch key 71 which may be established on the touch screen of the navigation system to enable the simple map mode as described above with reference to FIGS. 2A-2B and 3A-3B. Alternatively, as noted above with reference to FIGS. 4A and 4B, the simple map mode will be enabled by operation of other function, such as a map scroll function of the navigation system.

If it is determined that the simple map mode is not activated in the step 101, the navigation system keeps displaying the normal map image. If it is determined that the simple map mode is activated in the step 101, the navigation system checks whether the user has already set as to which map elements should be displayed and which map elements should not be displayed in the step 102. If it is determined that the map elements are already selected by the user, the navigation system checks the setting (FIGS. 6A and 6B) to determine which map elements should be displayed in the step 103.

If it is determined that the map elements are not selected by the user, the navigation system checks the default setting of the navigation system to determine which map elements are selected to be displayed and which map elements are not in the step 104. Based on the determinations in the steps 103 and 104, the navigation system will instruct the monitor screen to redraw a simple map image according to the settings in the step 105. Finally, in the step 106, the navigation system displays a new map image that has been simplified on the monitor screen.

FIG. 8 shows an embodiment of the structure of a vehicle navigation system for implementing the present invention. While the vehicle navigation system is explained for an illustration purpose, the present invention can also be applied to other types of navigation system, such as a portable navigation device implemented by a PDA (personal digital assistant) device, other hand-held devices such as a wireless telephone, or a laptop or notebook computer.

In the block diagram, the navigation system includes a data storage medium 31 such as a hard disc, CD-ROM, DVD or other storage means for storing the map data. The navigation system includes a control unit 32 for controlling an operation for reading the information from the data storage medium 31, and a position measuring device 33 for measuring the present vehicle position or user position. For example, the position measuring device 33 has a vehicle speed sensor for detecting a moving distance, a gyroscope for detecting a moving direction, a microprocessor for calculating a position, a GPS (global positioning system) receiver for receiving GPS signals from satellites and obtaining the current vehicle position, and etc.

The block diagram of FIG. 8 further includes a map information memory 34 for storing the map information which is read from the data storage medium 31, a database memory 35 for storing database information such as point of interest (POI) information which is read out from the data storage medium 31, a remote controller 37 for executing a menu selection operation, an enlarge/reduce operation, a destination input operation, etc. and a remote controller interface 38. Although a remote controller is a typical example for selecting menus, executing selected functions and etc., the navigation system includes various other input methods to achieve the same and similar operations done through the remote controller.

In FIG. 8, the navigation system further includes a bus 36 for interfacing the above units in the system, a processor (CPU) 39 for controlling an overall operation of the navigation system, a ROM 40 for storing various control programs such as a route search program and a map matching program necessary for navigation control, a RAM 41 for storing a processing result such as a guide route, a display controller 43 for generating map image (a map guide image and an arrow guide image) on the basis of the map information, a VRAM (video RAM) 44 for storing images generated by the display controller 43, a menu/list generating unit 45 for generating menu image/various list images, a synthesizing unit 46, a simple map display controller 47, a wireless transmitter 49 for wireless communication to retrieve data from a remote server, a buffer memory 48 for temporally storing data for ease of data processing, and a monitor (display) 50.

Typically, the data required for displaying the map image is stored in the VRAM 44. The ROM 40 stores a program that performs the operation described with reference to the flow chart of FIG. 7, which is executed by the simple map display controller 47. The simple map display controller 47 can be a part of the CPU 39 or a separate processor. The simple map display controller 47 instructs the display controller 43 to display certain map elements while eliminating other elements from the map image to show a simplified map image on the monitor screen.

The simple map display controller 47 checks the map information retrieved from the map database which is typically stored in the data storage medium 31 to identify the map elements to be displayed in the simple map mode and the map elements to be hidden in the simple map mode. FIGS. 9, 10A-10B, 11A-11B and 12A-12C show examples of data structures in the map database from which the specific information regarding the map elements and their locations, shapes, and other attributes may be obtained and their images will be either displayed or erased.

Figure 9:
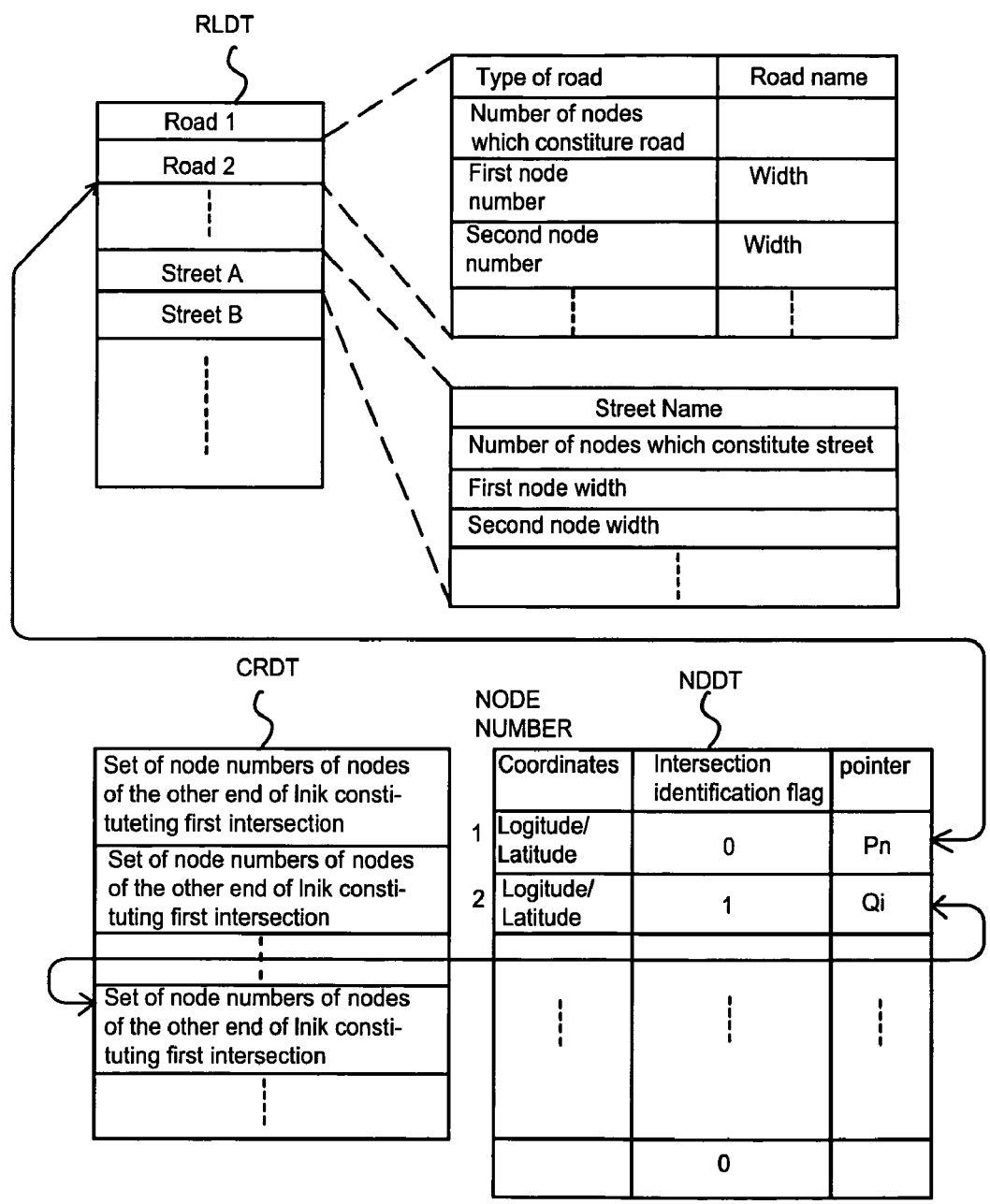
FIG. 9 illustrates an example of road layers or road function classes in the map database for selectively displaying the classes of roads on the monitor screen of the navigation system.

An example of layered structure of the map information in the map database (data storage medium 31) is shown in FIG. 9. In this example, the map information is composed of (1) road layers, (2) background layers for displaying objects thereon, (3) character layers for displaying characters, such as names of cities, towns, and villages, (4) POI icon layers for displaying POI icons appropriately at predetermined positions of POIs with predetermined color and contrast against the background, and other matters. Of these, as shown in FIG. 9, the road layers have road link data RLDT, node data NDDT, and intersection data CRDT, and are used for guidance route search processing and map matching processing.

The road link data RLDT, which supplies attribute information of a corresponding road, is composed of data such as the number of all the nodes (road segments) in a road link, the number of each node which is a constituent of the road, a road number (road name), and type of road (national road, superhighway, prefecture road, or other type of road and streets). Also, the intersection data CRDT is a set of nodes (referred to as "nodes constituting an intersection") closest to the intersection from among the nodes on the link, which are coupled to the intersection. The node data NDDT is a list of all the nodes (road segments) constituting the road, and is composed of positional information (longitude, latitude) for each node, an intersection identification flag as to whether or not the node is an intersection, a pointer which points to intersection data when the node is an intersection and which points to a road link to which the node belongs when the node is not an intersection, etc.

Figure 10A:
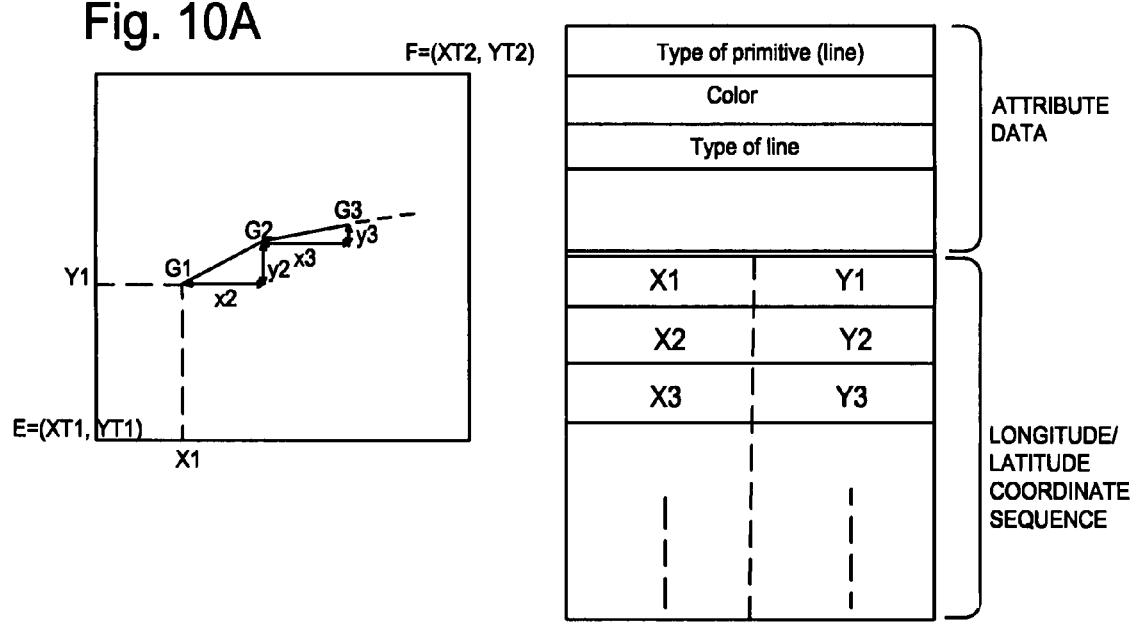
FIGS. 10A and 10B respectively illustrate an example of attribute data and position data in the map database for the map elements on the monitor screen of the navigation system where
Figure 10B:
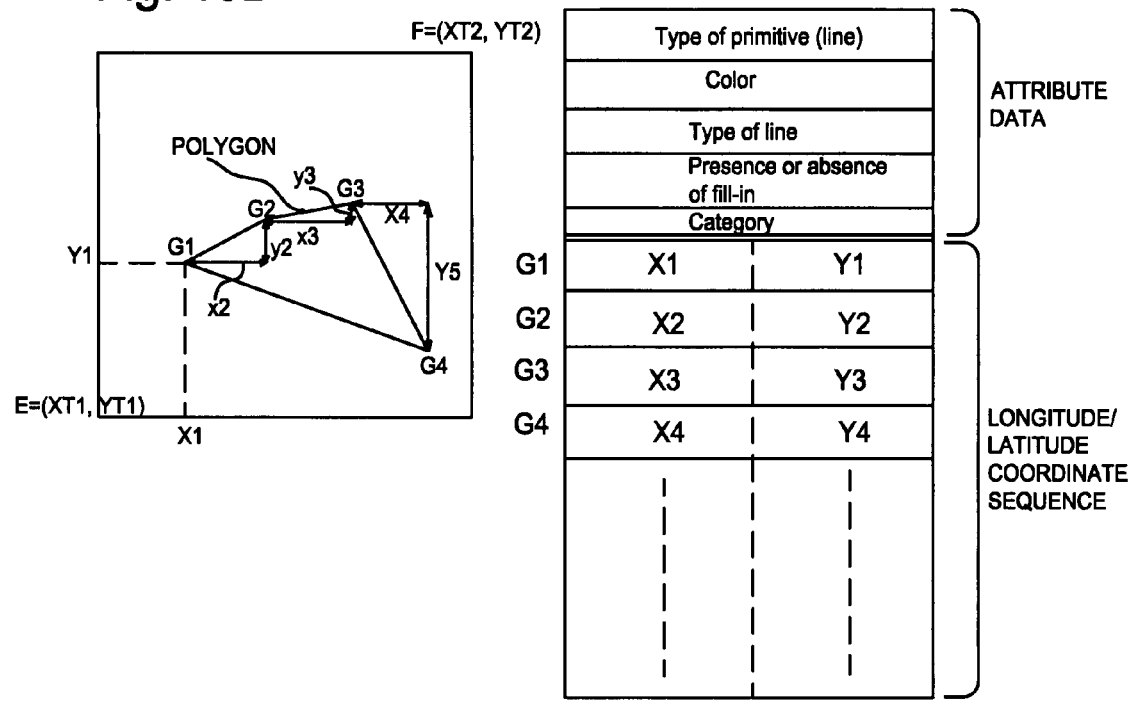

An example of layered data structure of the map information in the map database (data storage medium 31) regarding the background image is shown in FIGS. 10A and 10B. The background layer is divided into units which are further divided into predetermined longitude widths and latitude widths, and has figure data representing plane figures, such as roads, buildings, parks, rivers, lakes, etc., in each unit. As shown in FIGS. 10A and 10B, the range in the absolute longitude and latitude coordinates (X, Y) of each unit is determined by the absolute longitude and latitude coordinates (XT1, YT1) and (XT2, YT2) of diagonal vertexes E and F.

In FIGS. 10A and 10B, the data of each unit contains (1) attributes, such as a type of primitive, i.e., a line or a polygon, color, and a type of line, and (2) in the case of a line, transition points, for example, a longitude/latitude coordinate sequence $(x1, y1), (x2, y2), \ldots, (xn, yn)$ of each of the element points G1 to Gn, and in the case of a polygon, the presence or absence of fill-in, and vertexes, for example, a longitude/latitude coordinate sequence $(x1, y1), (x2, y2), \ldots, (xn, yn)$ of each of the element points G1 to Gn. Also, in the case of a polygon, the data contains data indicating the category (hotels, restaurants, airports, stations, shopping centers, sports facilities, hospitals, golf courses, etc.) of buildings and facilities represented by the polygons.

Figures 11A, 11B:
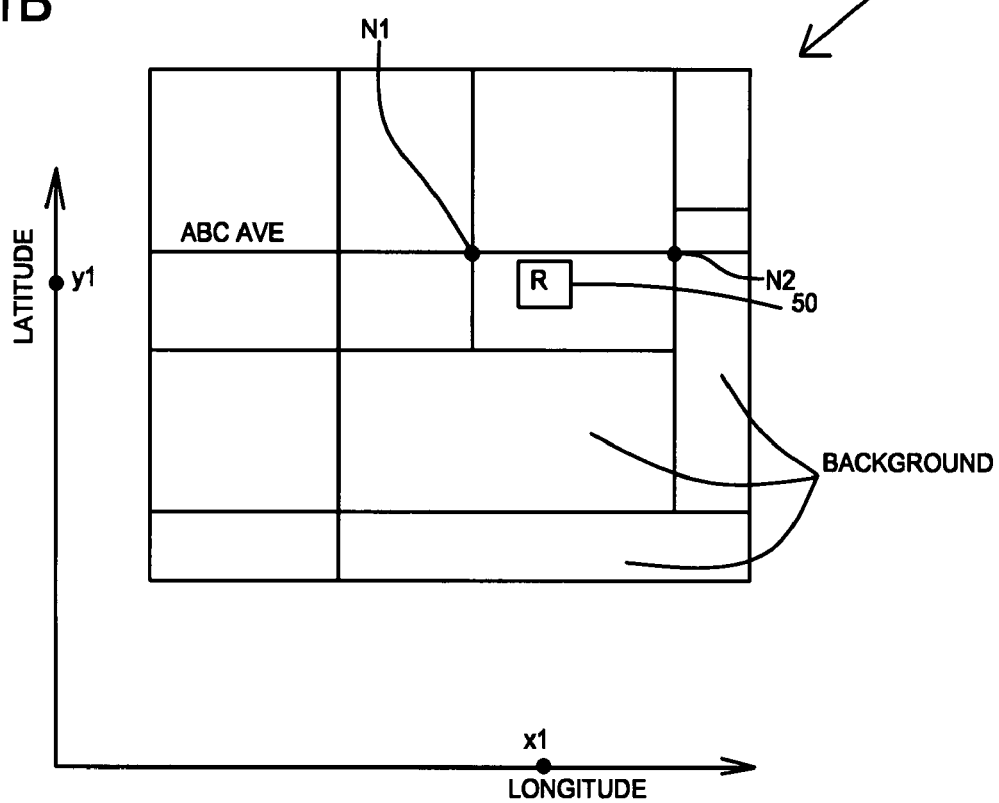
FIG. 11 illustrates an example of POI data in the map database for illustrating the POI icons as the map elements on the monitor screen of the navigation system.

An example of layered data structure of the map information in the map database (data storage medium 31) regarding the POI is shown in FIGS. 11A and 11B. The POI icon layer is divided according to each unit, and POI icon data shown in FIG. 11A is stored for each POI unit. The POI icon data has, (1) longitude and latitude positions of a POI, (2) a POI icon code including color code to be displayed, (3) a name of road the POI faces, (4) link-constituting nodes of road link in which the POI is present, (5) a category of the POI, and (6) a name of the POI. In the example of FIG. 11A, a POI icon 50 is displayed along ABC Avenue at a predetermined position on a map at which BBB restaurant is located, as shown in FIG. 11B.

The POI database memory 35 (FIG. 8) stores therein the data regarding a large number of POIs corresponding to various categories, and furthermore, stores the addresses of POIs, telephone numbers, longitude and latitude positions, categories, information specific to POIs, etc., corresponding to each POI. FIGS. 12A-12C illustrate an example of layered structure of the POI data in the map database for the representations of the POI icons on the screen of the navigation system. FIG. 12A shows a category list, FIG. 12B shows a POI list of restaurants in the restaurant category, and FIG. 12C shows a list of detailed information regarding the BBB restaurant as POIs in the restaurant category.

As has been described above, according to the present invention, the navigation system enables to simplify the map image so that the simple map allows the user to quickly grasp the important information at a glance. The navigation system is capable of pre-setting as to which map elements will be displayed and which map elements will not be displayed in the simplified map image so that the degree of simplifying the map image can be adjusted. The navigation system is designed to switch between the normal map view and the simple map view by an operation of a switch or key. Alternatively, the normal map view and the simple map view are automatically switched therebetween depending on whether a specific function is operated or not. The simple map view shows a simplified map image which eliminates some of the map elements with lower priority to prevent the driver from being distracted from driving when he/she would try to obtain the information from the complicated map image.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A display method for a navigation system, comprising the following steps of:
    setting either a simple map mode or a normal map mode in the navigation system;
    checking whether the simple map mode or the normal map mode is set for displaying a map image on a monitor screen of the navigation system;
    determining which map elements are selected to be displayed when the simple map mode is set; and
    displaying either the map image with only the selected map elements when the simple map mode has been set or the map image with all the map elements when the normal map mode has been set;
    wherein the setting between the simple map mode and the normal map mode is conducted without changing a display range of the map image, and wherein said step of setting the simple map mode or the normal map mode is conducted automatically by an operation of a map scroll function in which the map image is scrolled from one location to another.

2. A display method for a navigation system as defined in claim 1, further comprising a step of displaying an indicator that indicates whether the simple map mode or the normal map mode has been set.

3. A display method for a navigation system as defined in claim 1, wherein said step of setting the simple map mode or the normal map mode is conducted manually by operating a switch on the navigation system.

4. A display method for a navigation system as defined in claim 1, wherein the map image in the simple map mode is displayed when the map scroll function is inactive whereas the map image in the normal map mode is displayed when the map scroll function is activated.

5. A display method for a navigation system as defined in claim 1, further comprising a step of selecting which map elements should be displayed and which map elements should not be displayed on the map image in the simple map mode.

6. A display method for a navigation system as defined in claim 5, wherein said step of selecting which map elements should be displayed includes a step of displaying a screen which lists categories of the map elements so that a user can specify which map elements should be displayed in the simple map mode.

7. A display method for a navigation system as defined in claim 5, wherein said map elements that are selected not to be displayed in the simple map mode are building images.

8. A display method for a navigation system as defined in claim 5, wherein said map elements that are selected not to be displayed in the simple map mode are POI icons, and wherein said step of selecting which map elements should be displayed includes a step of displaying a screen which lists categories of POI icons so that a user can specify which POI icons or none of the POI icons should be displayed in the simple map mode.

9. A display apparatus for a navigation system, comprising the following steps of:
    means for setting either a simple map mode or a normal map mode in the navigation system;
    means for checking whether the simple map mode or the normal map mode is set for displaying a map image on a monitor screen of the navigation system;
    means for determining which map elements are selected to be displayed when the simple map mode is set; and
    means for displaying either the map image with only the selected map elements when the simple map mode has been set or the map image with all the map elements when the normal map mode has been set;
    wherein the setting between the simple map mode and the normal map mode is conducted without changing a display range of the map image, and wherein said means of setting the simple map mode or the normal map mode is conducted automatically by an operation of a map scroll function in which the map image is scrolled from one location to another.

10. A display apparatus for a navigation system as defined in claim 9, further comprising means for displaying an indicator that indicates whether the simple map mode or the normal map mode has been set.

11. A display apparatus for a navigation system as defined in claim 9, wherein said means for setting the simple map mode or the normal map mode is conducted manually by operating a switch on the navigation system.

12. A display apparatus for a navigation system as defined in claim 9, wherein the map image in the simple map mode is displayed when the map scroll function is inactive whereas the map image in the normal map mode is displayed when the map scroll function is activated.

13. A display apparatus for a navigation system as defined in claim 9, further comprising means for selecting which map elements should be displayed and which map elements should not be displayed on the map image in the simple map mode.

14. A display apparatus for a navigation system as defined in claim 13, wherein said means for selecting which map elements should be displayed includes means for displaying a screen which lists categories of the map elements so that a user can specify which map elements should be displayed in the simple map mode.

15. A display apparatus for a navigation system as defined in claim 13, wherein said map elements that are selected not to be displayed in the simple map mode are building images.

16. A display apparatus for a navigation system as defined in claim 13, wherein said map elements that are selected not to be displayed in the simple map mode are POI icons, and wherein said means for selecting which map elements should be displayed includes means for displaying a screen which lists categories of POI icons so that a user can specify which POI icons or none of the POI icons should be displayed in the simple map mode.

* * * * *